US008599368B1

United States Patent
Cilia et al.

(10) Patent No.: US 8,599,368 B1
(45) Date of Patent: Dec. 3, 2013

(54) LASER-BASED SPEED DETERMINATION DEVICE FOR USE IN A MOVING VEHICLE

(75) Inventors: Andrew Cilia, McKinney, TX (US); Robert V. Vanman, McKinney, TX (US)

(73) Assignee: Enforcement Video, LLC, Allen, TX (US)

( * ) Notice: Subject to any disclaimer, the term of this patent is extended or adjusted under 35 U.S.C. 154(b) by 658 days.

(21) Appl. No.: 12/362,302

(22) Filed: Jan. 29, 2009

Related U.S. Application Data

(60) Provisional application No. 61/024,310, filed on Jan. 29, 2008.

(51) Int. Cl.
 *G01P 3/36* (2006.01)
(52) U.S. Cl.
 USPC .......................................... 356/28; 356/28.5
(58) Field of Classification Search
 USPC ............................... 356/3.01–28.5
 See application file for complete search history.

(56) References Cited

U.S. PATENT DOCUMENTS

| | | | |
|---|---|---|---|
| 4,389,706 A | 6/1983 | Gomola et al. | |
| 4,949,186 A | 8/1990 | Peterson | |
| 5,651,075 A | 7/1997 | Frazier et al. | |
| 5,677,979 A | 10/1997 | Squicciarini et al. | |
| 5,703,604 A | 12/1997 | McCutchen | |
| 5,809,161 A * | 9/1998 | Auty et al. | 382/104 |
| 5,844,599 A | 12/1998 | Hildin | |
| 5,898,866 A | 4/1999 | Atkins et al. | |
| 6,215,519 B1 | 4/2001 | Nayar et al. | |
| 6,252,989 B1 | 6/2001 | Geisler et al. | |
| 6,282,462 B1 | 8/2001 | Hopkins | |
| 6,335,789 B1 * | 1/2002 | Kikuchi | 356/141.1 |
| 6,345,219 B1 | 2/2002 | Klemens | |
| 6,373,962 B1 | 4/2002 | Kanade et al. | |
| 6,389,340 B1 * | 5/2002 | Rayner | 701/32.4 |
| 6,445,824 B2 | 9/2002 | Hieda | |
| 6,456,321 B1 | 9/2002 | Ito et al. | |
| 6,704,281 B1 | 3/2004 | Hourunranta et al. | |
| 6,707,489 B1 | 3/2004 | Maeng et al. | |
| 6,734,911 B1 | 5/2004 | Lyons | |
| 6,801,574 B2 | 10/2004 | Takeuchi et al. | |
| 6,831,556 B1 | 12/2004 | Boykin | |
| 7,023,913 B1 | 4/2006 | Monroe | |
| 7,119,832 B2 | 10/2006 | Blanco et al. | |
| 7,215,876 B2 | 5/2007 | Okada et al. | |
| 7,262,790 B2 * | 8/2007 | Bakewell | 348/148 |
| 7,272,179 B2 | 9/2007 | Siemens et al. | |
| 7,373,395 B2 | 5/2008 | Brailean et al. | |
| 7,405,834 B1 * | 7/2008 | Marron et al. | 356/521 |
| 7,495,579 B2 | 2/2009 | Sirota et al. | |

(Continued)

OTHER PUBLICATIONS

Kortum, P. et al., "Implementation of a foveated image coding system for image bandwidth reduction", SPIE Proceedings, vol. 2657, 1996, pp. 350-360, XP-002636638.

(Continued)

*Primary Examiner* — Luke Ratcliffe
(74) *Attorney, Agent, or Firm* — Winstead PC

(57) ABSTRACT

A method of laser-based speed determination includes determining, via a digital scan of a field of view, a location of a target, directing, via a laser-aiming device, a laser from a laser device to the determined location, and determining a speed of the target via light reflected from the target to the laser device.

30 Claims, 7 Drawing Sheets

(56) References Cited

U.S. PATENT DOCUMENTS

| | | |
|---|---|---|
| 7,574,131 B2 | 8/2009 | Chang et al. |
| 7,583,290 B2 | 9/2009 | Enright et al. |
| 7,711,150 B2 | 5/2010 | Simon |
| 7,768,548 B2 | 8/2010 | Silvernail et al. |
| 7,894,632 B2 | 2/2011 | Park et al. |
| 7,929,010 B2 | 4/2011 | Narasimhan |
| 8,022,874 B2 | 9/2011 | Frieaizen |
| 2002/0040475 A1 | 4/2002 | Yap et al. |
| 2002/0064314 A1 | 5/2002 | Comaniciu et al. |
| 2002/0140924 A1* | 10/2002 | Wangler et al. ............ 356/28 |
| 2002/0141618 A1 | 10/2002 | Ciolli et al. |
| 2002/0141650 A1 | 10/2002 | Keeney et al. |
| 2002/0149476 A1* | 10/2002 | Ogura ............ 340/436 |
| 2002/0180759 A1 | 12/2002 | Park et al. |
| 2003/0025599 A1 | 2/2003 | Monroe |
| 2003/0025812 A1 | 2/2003 | Slatter |
| 2003/0071891 A1 | 4/2003 | Geng |
| 2003/0112133 A1 | 6/2003 | Webb et al. |
| 2003/0172123 A1 | 9/2003 | Polan et al. |
| 2003/0214585 A1 | 11/2003 | Bakewell |
| 2004/0056779 A1 | 3/2004 | Rast |
| 2004/0080615 A1 | 4/2004 | Klein et al. |
| 2004/0119869 A1 | 6/2004 | Tretter et al. |
| 2004/0150717 A1 | 8/2004 | Page et al. |
| 2004/0218099 A1 | 11/2004 | Washington |
| 2004/0221311 A1 | 11/2004 | Dow et al. |
| 2004/0223058 A1 | 11/2004 | Richter et al. |
| 2004/0252193 A1 | 12/2004 | Higgins |
| 2004/0258149 A1 | 12/2004 | Robinson et al. |
| 2005/0090961 A1 | 4/2005 | Bonk et al. |
| 2005/0196140 A1 | 9/2005 | Moteki |
| 2005/0206773 A1 | 9/2005 | Kim et al. |
| 2006/0028547 A1 | 2/2006 | Chang |
| 2006/0033813 A1 | 2/2006 | Provinsal et al. |
| 2006/0098843 A1 | 5/2006 | Chew |
| 2006/0152636 A1 | 7/2006 | Matsukawa et al. |
| 2006/0158968 A1 | 7/2006 | Vanman et al. |
| 2006/0159325 A1 | 7/2006 | Zeineh et al. |
| 2006/0187305 A1 | 8/2006 | Trivedi et al. |
| 2006/0193384 A1 | 8/2006 | Boyce |
| 2006/0244826 A1 | 11/2006 | Chew |
| 2007/0024706 A1 | 2/2007 | Brannon et al. |
| 2007/0029825 A1 | 2/2007 | Franklin et al. |
| 2007/0109411 A1 | 5/2007 | Jung et al. |
| 2007/0200933 A1 | 8/2007 | Watanabe et al. |
| 2007/0217761 A1 | 9/2007 | Chen et al. |
| 2007/0222678 A1* | 9/2007 | Ishio et al. ............ 342/372 |
| 2007/0222859 A1 | 9/2007 | Chang et al. |
| 2007/0296817 A1 | 12/2007 | Ebrahimi et al. |
| 2008/0007438 A1 | 1/2008 | Segall et al. |
| 2009/0046157 A1 | 2/2009 | Cilia et al. |
| 2009/0049491 A1 | 2/2009 | Karonen et al. |
| 2009/0102950 A1 | 4/2009 | Ahiska |
| 2009/0129672 A1 | 5/2009 | Camp, Jr. et al. |
| 2009/0207248 A1 | 8/2009 | Cilia et al. |
| 2009/0213218 A1 | 8/2009 | Cilia et al. |
| 2009/0251530 A1 | 10/2009 | Cilia |
| 2011/0157376 A1 | 6/2011 | Lyu et al. |
| 2011/0234749 A1 | 9/2011 | Alon |

OTHER PUBLICATIONS

Geisler, Wilson S. et al., "A real-time foveated multiresolution system for low-bandwidth video communication", Proceedings of the SPIE—The International Society for Optical Engineering SPIE—Int. Soc. Opt. Eng. USA, vol. 3299,1998, pp. 294-305, XP-002636639.

U.S. Appl. No. 12/694,931, Cilia.
U.S. Appl. No. 12/779,492, Vanman.
U.S. Appl. No. 12/779,564, Vanman.
U.S. Appl. No. 12/780,050, Vanman.
U.S. Appl. No. 12/780,092, Vanman.
U.S. Appl. No. 13/095,107, Cilia.
U.S. Appl. No. 13/109,557, Cilia.
Copenheaver, Blaine R., International Search Report for PCT/US2009/000930 as mailed Apr. 9, 2009, (4 pages).
Young, Lee W., International Search Report for PCT/US2009/000934 as mailed Apr. 29, 2009, (3 pages).
Copenheaver, Blaine R., International Search Report for PCT/US2010030861 as mailed Jun. 21, 2010, (4 pages).
Nhon, Diep T., International Search Report for PCT/US05/36701 as mailed Oct. 25, 2006, 5 pages.
Copenheaver, Blaine R., International Search Report for PCT/US2009/032462 as mailed Mar. 10, 2009 (3 pages).
Cilia, Andrew, "U.S. Appl. No. 13/489,615", filed Jun. 6, 2012.

\* cited by examiner

LASER-BASED SPEED DETERMINATION DEVICE FOR USE IN A MOVING VEHICLE

CROSS-REFERENCE TO RELATED APPLICATIONS

This patent application claims priority from, and incorporates by reference for any purpose the entire disclosure of, U.S. Provisional Patent Application No. 61/024,310, filed Jan. 29, 2008. This patent application incorporates by reference for any purpose the entire disclosures of U.S. Provisional Patent Application No. 60/955,442, filed Aug. 13, 2007, and U.S. patent application Ser. No. 12/188,273, filed Aug. 8, 2008.

BACKGROUND

1. Technical Field

This application relates generally to speed-determination devices and more particularly, but not by way of limitation, to systems and methods for laser-based speed-determination.

2. Background

The use of speed-determination devices in law enforcement has been known for many years. Initially, most speed-detection systems required a patrol officer to be stationary, which placed the patrol officer at a significant disadvantage when attempting to pull over a speeding vehicle. In recent years, various attempts have been made to develop speed-detection systems that can be used in moving vehicles.

Most current commercially available speed-detection devices utilize radar. Radar can be used to measure ground speed as well as closure rate of a target vehicle, thereby allowing speed measurement from a moving vehicle. However, radar suffers from many limitations involving inaccurate target identification. Radar-based devices typically display a speed for either the fastest vehicle or the vehicle reflecting the strongest signal; it is then up to the patrol officer to determine what he believes to be the target for which the speed is being displayed.

Laser-based devices have also been developed for use in speed-determination. Laser exhibits many improvements over radar in the area of target identification. However, laser also suffers from a limitation that it requires the patrol officer to be stationary and has not been successfully applied to a moving vehicle.

SUMMARY OF THE INVENTION

A method of laser-based speed determination includes determining, via a digital scan of a field of view, a location of a target, directing, via a laser-aiming device, a laser from a laser device to the determined location, and determining a speed of the target via light reflected from the target to the laser device.

A laser-based speed-determination system includes a laser device, a laser-aiming device coupled to the laser device, and a processing device in communication with the laser device and the laser-aiming device. The processing device is adapted to execute instructions to determine, via a digital scan of a field of view, a location of a target, cause, via the laser-aiming device, a laser to be directed from the laser device to the determined location, and determine a speed of the target, the speed being determined via light reflected from the target to the laser device.

BRIEF DESCRIPTION OF THE DRAWINGS

A more complete understanding of various embodiments of the present invention may be obtained by reference to the following Detailed Description when taken in conjunction with the accompanying Drawings, wherein.

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1:
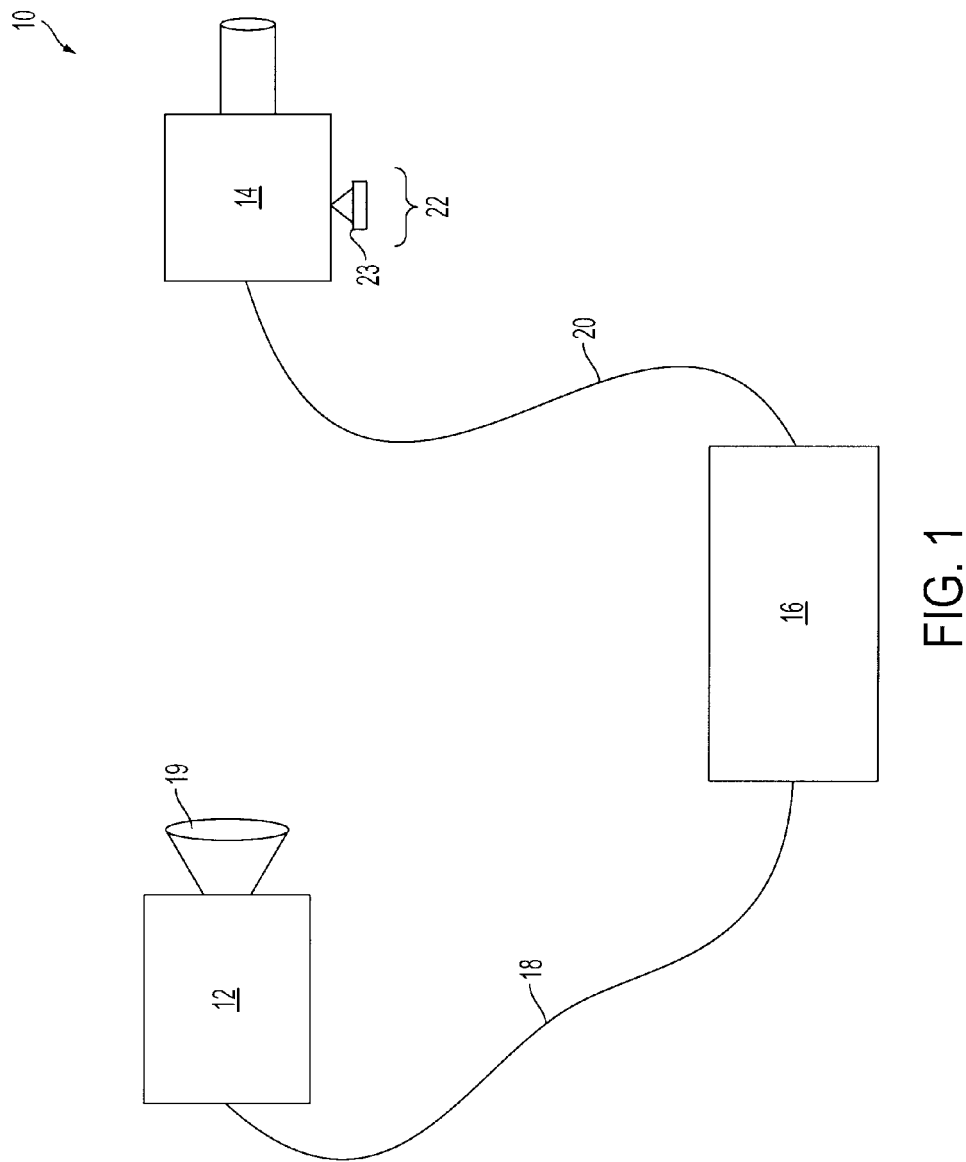
FIG. 1 is a diagram of a system for laser-based speed-determination.

FIG. 1 is a system 10 for laser-based speed-determination. The system 10 includes a wide-angle camera 12, a laser device 14, a computer 16, and a laser-aiming device 22. The wide-angle camera 12 includes a wide-angle lens 19 and is electrically connected to the computer 16 via a cable 18. The laser device 14 is electrically connected to the computer 16 via a cable 20 and utilized in conjunction with the laser-aiming device 22. In the embodiment illustrated in FIG. 1, the laser-aiming device 22 is connected to the computer 16 via a wireless connection. The laser-aiming device 22 is shown to include a pan/tilt device 23. Although the wide-angle camera 12 and the laser device 14 are depicted by way of example as being connected to the computer 16 via cables 18 and 20, it is also contemplated that the wide-angle camera 12 and the laser device 14 could be connected to the computer 16 by way of wireless connections. Similarly, although the laser-aiming device 22 is described by way of example as being connected to the computer 16 via the wireless connection, it is also contemplated that the laser-aiming device 22 could be electrically connected to the computer 16 by way of a cable.

As will be apparent to one of ordinary skill in the art, a traditional laser speed-determination device typically fires a short burst of infrared laser light and waits for the laser light to reflect off of a target. The target may be, for example, a moving vehicle. The laser speed-determination device determines the amount of time required for a round trip by the laser light and, by utilizing a known velocity of the laser light and dividing by 2, calculates a distance to the target. The typical device determines a change in distance between bursts (i.e., samples) and calculates a speed of the target. By taking, for example, several hundred samples over the course of, for example, a third of a second, accuracy of the calculated speed can be very high.

In contrast, the system 10 permits laser-based speed-determination in situations when the system 10 is not stationary, such as when utilized within a moving vehicle. By controlling the laser-aiming device 22 via the wireless connection, the computer 16 is able to accurately direct a laser from the laser device 14 to targets. To further facilitate laser-based speed determination in situations when the system 10 is not stationary, the computer 16 detects and considers ground speed of the system 10, for example, by using a Global Positioning System (GPS). As a result, the computer 16 is capable of calculating the speeds of the targets even when both the system 10 and the targets are independently in motion relative to a fixed point. As illustrated in FIG. 1, the laser-aiming device 22 may, for example, include the pan/tilt device 23. The computer 16, in the illustrated embodiment, controls the pan/tilt device 23 via the wireless connection to direct the laser device 14 to the targets.

The wide-angle camera 12 provides access to a field of view defined by the extent of a given scene that is imaged. The wide-angle camera 12 is capable of transmitting an image of the field of view at any instant in time to the computer 16. The field of view may be provided at regular intervals, in a continuous stream, or on-demand. The computer 16 operates an image-recognition platform that is capable of identifying within the image targets for laser-based speed-determination.

Once the targets have been identified, the computer 16 ascertains a location within the field of view for each identified target. The computer 16 directs the laser device 14 via the laser-aiming device 22 to the identified target. For example, in one embodiment, the image-recognition platform identifies the targets by recognizing license plates on vehicles within the image provided by the wide-angle camera 12. In the embodiment, the image-recognition platform ascertains the locations within the field of view of the identified license plates. The computer 16 drives the laser device 14 via the laser-aiming device 22 to point at the ascertained locations of the identified license plates in order to determine speeds of each of the vehicles.

Figure 2:
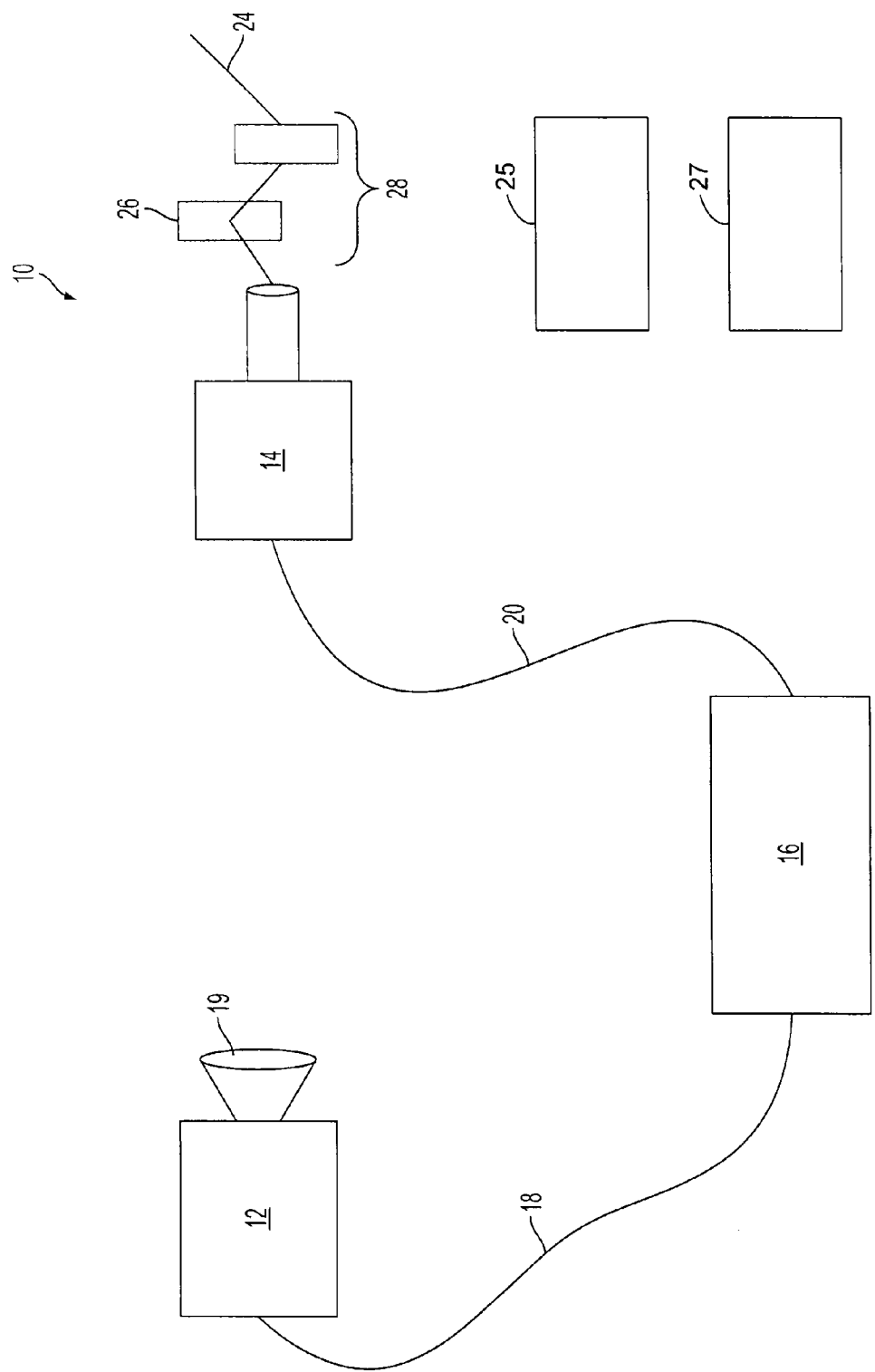
FIG. 2 is a diagram of a system for laser-based speed-determination.

FIG. 2 is a diagram of the system 10 with another configuration of a laser-aiming device. As illustrated in FIG. 2, a laser-aiming device 28 may include a dual-mirror mechanism 26 that is capable of directing a laser 24 from the laser device 14. In the embodiment illustrated in FIG. 2, the computer 16 controls and monitors the laser-aiming device 28 via a wireless connection. It is also contemplated, however, that the laser-aiming device 28 and the computer 16 may be electrically connected, for example, by a cable. The dual-mirror mechanism 26 can include, for example, two mirrors in which a first mirror permits aiming in a horizontal direction and a second mirror permits aiming in a vertical direction. The two mirrors may oscillate so as to permit the laser device 14 to be directed to any coordinate within the field of view at periodic intervals. The mirrors may be attached to electro-mechanical actuators such as servos, galvanometers, or piezoelectric or other types of motors that can be controlled and/or monitored by the computer 16.

A laser-aiming device as shown and described in FIGS. 1 and 2 can also include a rotating mirror wheel 25 having multiple mirror facets. Vertical laser aim may be provided via a change in angular orientation of the mirrors as the mirror wheel 25 rotates, while horizontal aim may be achieved by grinding each of the mirror facets with a slightly different horizontal inclination. In some embodiments, the mirror wheel 25 may be tilted using an electromechanical actuator. The computer 16 may direct a laser by firing the laser device 14 at the exact time a desired vertical and horizontal deflection of the mirror facet passes in front of the laser device 14.

A laser-aiming device as shown and described in FIGS. 1 and 2 can also include a single mirror 27 mounted in a mechanical armature that pivots both horizontally and vertically. The armature may be moved by electromechanical actuators or miniature micro-electro-mechanical-system (MEMS) actuators controlled by the computer 16. A laser-aiming device as shown and described in FIGS. 1 and 2 can also include a photoacoustic actuator or use other methods that vary a refractance index of a transparent medium.

Referring again to FIG. 1, to ensure proper operation of the system 10 for laser-based speed-determination, in some embodiments, the laser-aiming device 22 is initially calibrated according to the field of view provided by the wide-angle camera 12. In order to facilitate consistent referencing of precise locations within the field of view, calibration of the laser-aiming device 22 may involve definition of a coordinate system for the field of view. In a typical embodiment, the coordinate system is two-dimensional, consisting of x and y coordinates for referring to the field of view in a grid-like manner. It is also contemplated that, in other embodiments, a camera providing a 360 degree field of view may be utilized in place of the wide-angle camera 12, thus necessitating a three-dimensional coordinate system that further incorporates a z-coordinate. In some embodiments, the coordinate system operates on a pixel-by-pixel basis according to pixel resolution provided by the wide-angle camera 12. In these embodiments, a particular set of coordinates identifies a specific pixel within the field of view. One of ordinary skill in the art will recognize that the coordinate system may be as precise as hardware in the wide-angle camera 12 allows.

Figure 3:
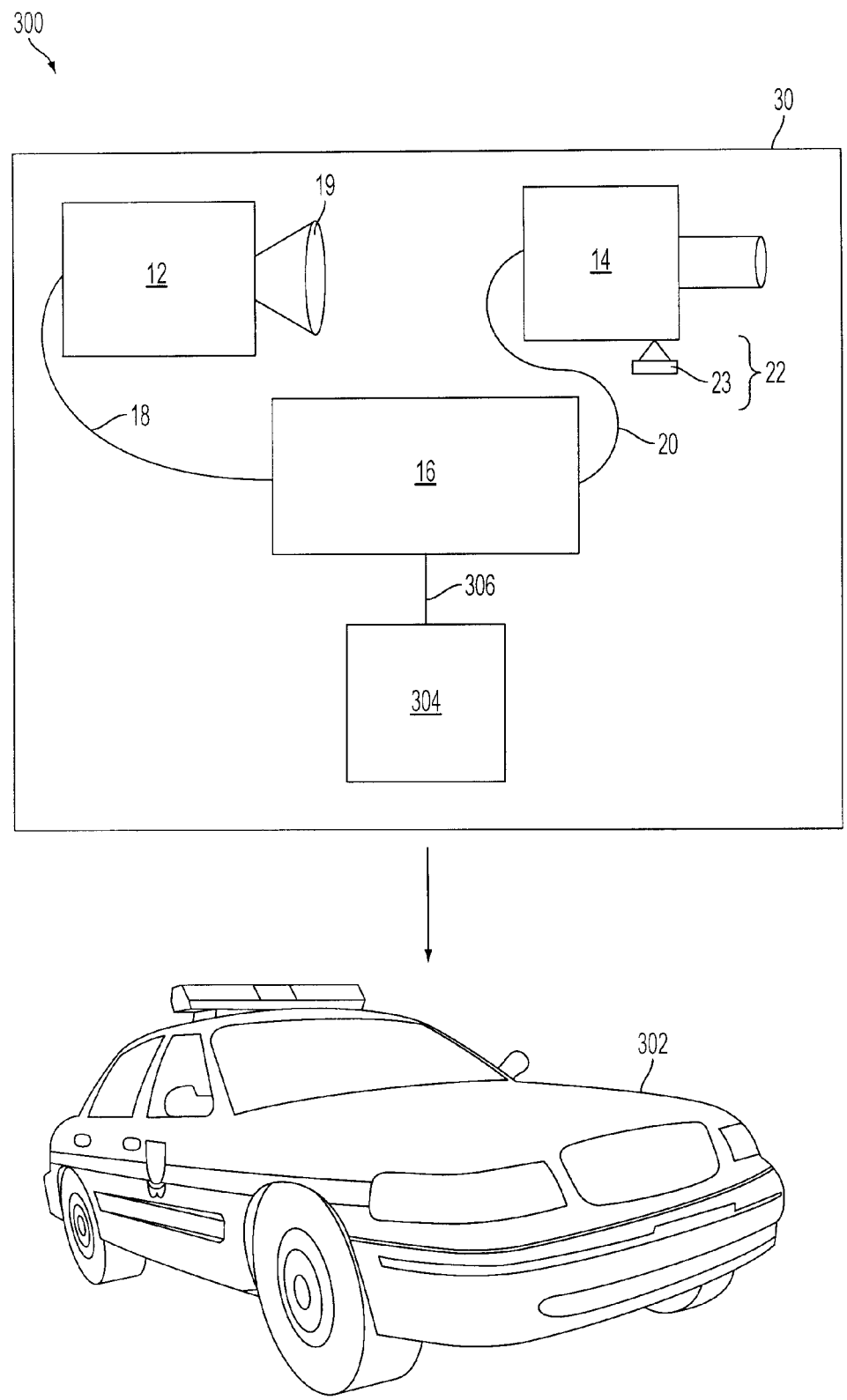
FIG. 3 is a diagram of a system for mobile laser-based speed-determination.

FIG. 3 illustrates a system 300 for mobile laser-based speed-determination. The system 300 includes a system 30 for laser-based speed-determination that is installed in a vehicle 302. In installation, the laser-aiming device 22 is calibrated with the field of view provided by the wide-angle camera 12. The system 30 further includes a display device 304 that displays, for example, the field of view provided by the wide-angle camera 12. Although the display device 304 is depicted as being electrically connected to the computer 16 by way of a cable 306, it is also contemplated that the display device 304 may be connected to the computer 16 by way of a wireless connection. The display device 306 may be utilized, for example, to display a video stream provided by the wide-angle camera 12 or annotated images or video from the computer 16. The display device 306 will be discussed in further detail below.

Figure 4:
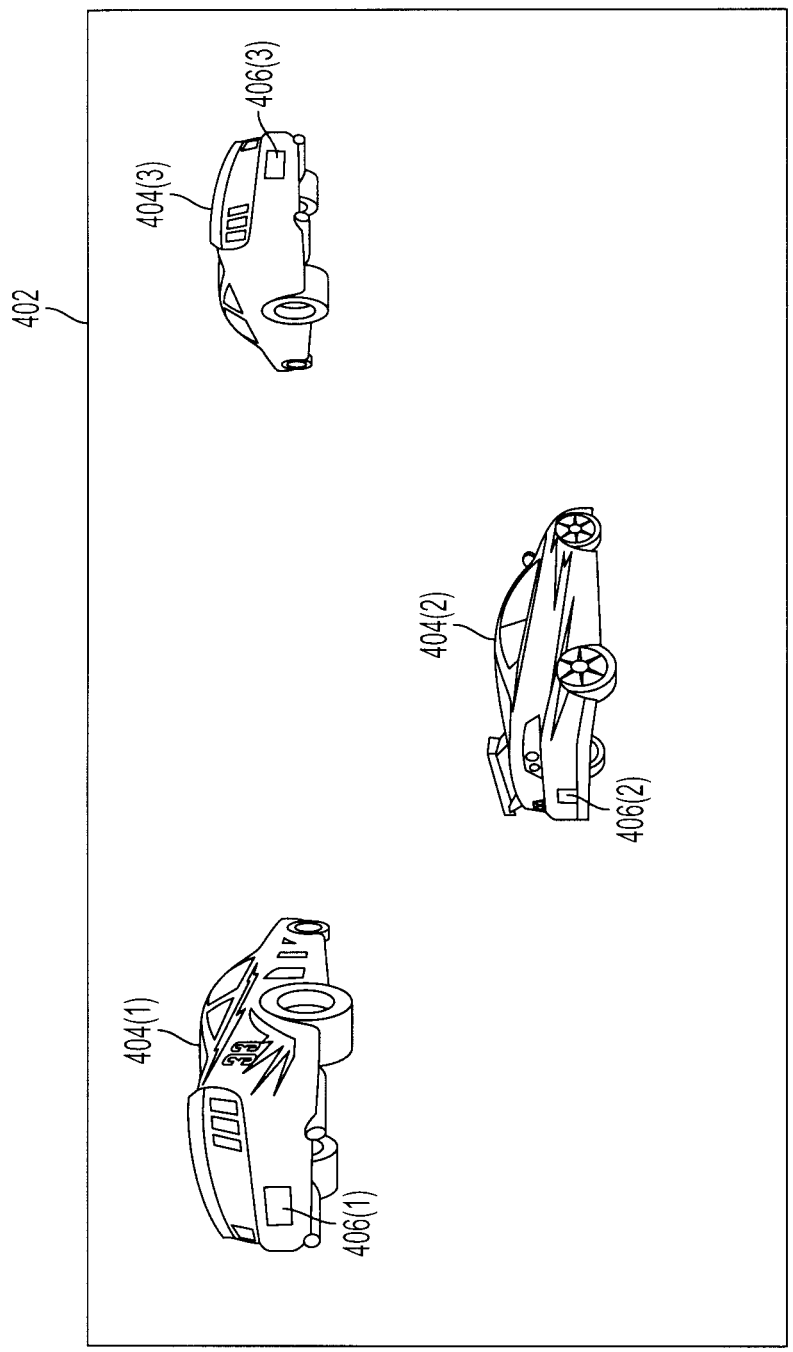
FIG. 4 is a diagram of an exemplary field of view.

FIG. 4 depicts an exemplary field of view 402 provided by the wide-angle camera 12. The wide-angle camera 12 provides an image of the field of view 402 to the computer 16. The field of view 402 includes vehicles 404(1), 404(2), and 404(3), each having a license plate 406. The computer 16, via the image-recognition platform, is able to identify targets for laser-based speed-determination based on identification of license plates 406(1), 406(2), and 406(3). The computer 16 ascertains coordinates for each vehicle 404 based on positions of the license plates 406 within the field of view 402. The computer 16 is capable of directing the laser device 14 to each identified target by way of the laser-aiming device 22. The computer 16 calculates a speed for each moving vehicle 404 via light reflected from the license plates 406 to the laser device 14.

Figure 5:
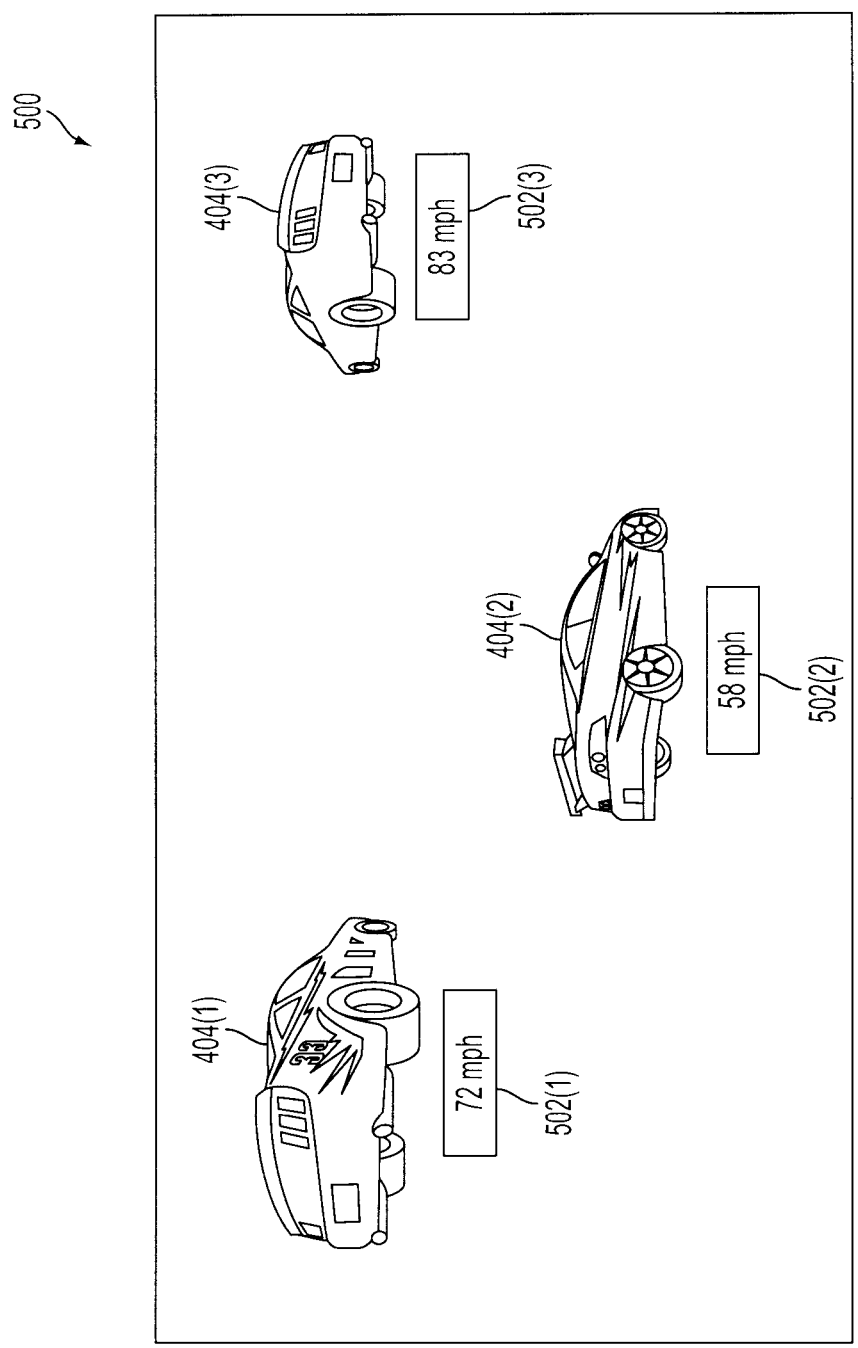
FIG. 5 is a diagram of an exemplary display on a display device.

FIG. 5 illustrates an exemplary display 500 of the display device. After calculating speeds for the identified targets, the computer 16 may, in some embodiments, annotate the image of the field of view with speeds 502(1), 502(2), and 502(3) for display on the display device 306. In that way, an operator in the vehicle 302 may track multiple identified targets while the vehicle 302 is in motion.

Figure 6:
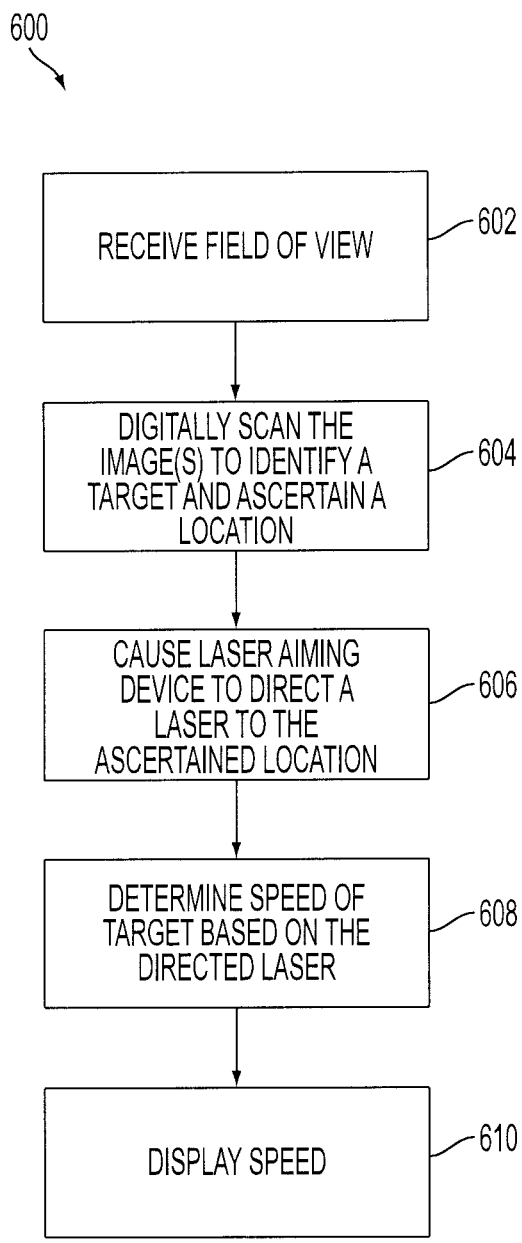
FIG. 6 is a flow chart of a process for utilizing a system for laser-based speed-determination.

FIG. 6 illustrates a process 600 for operation of a computer such as, for example, computer 16, according to various embodiments of the invention. At step 602, the computer receives a field of view such as, for example, one or more images transmitted by the wide-angle camera 12. From step 602, execution proceeds to step 604. At step 604, the computer digitally scans the field of view in order to identify at least one target and ascertain a location for the at least one target. For example, as noted above, the at least one target may be one or more license plates on moving vehicles and the ascertained location may be represented by a set of coordinates that references the field of view. From step 604, execution proceeds to step 606. At step 606, the computer causes a laser-aiming device such as, for example, laser-aiming device 22, to direct a laser to the ascertained location. The laser may be, for example, a laser from the laser device 14. From step 606, execution proceeds to step 608. At step 608, the computer determines a speed of the at least one target based on the directed laser. From step 608, execution proceeds to step 610. At step 610, the computer displays the speed. One of ordinary skill in the art will recognize that the process 600 may be employed to simultaneously display speeds for multiple vehicles.

Figure 7:
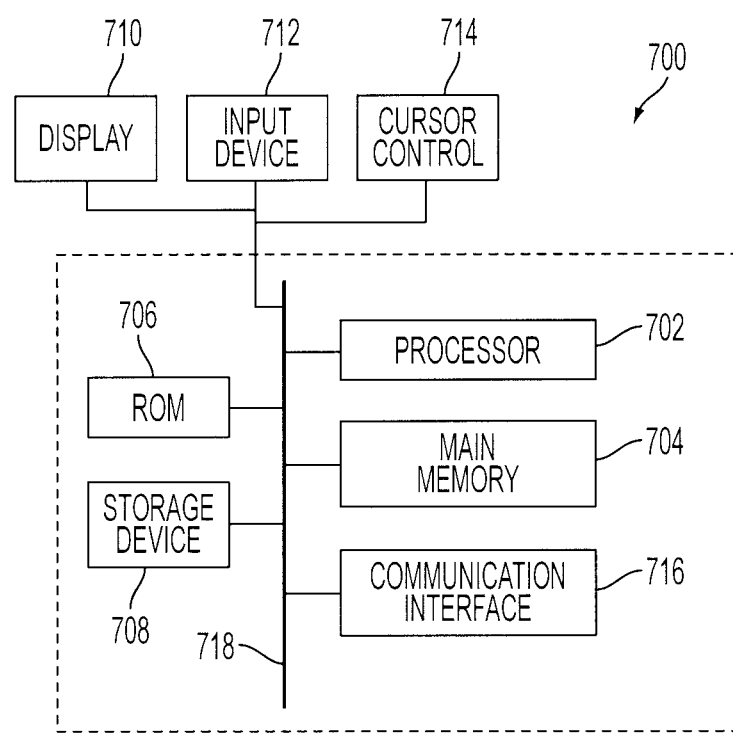
FIG. 7 illustrates an embodiment of a computer on which various embodiments of the invention may be implemented.

FIG. 7 illustrates an embodiment of a computer on which various embodiments of the invention may be implemented, including a computer 16. In the implementation, a computer 700 may include a bus 718 or other communication mechanism for communicating information and a processor 702 coupled to the bus 718 for processing information. The computer 700 also includes a main memory 704, such as random access memory (RAM) or other dynamic storage device, coupled to the bus 718 for storing computer readable instructions by the processor 702.

The main memory 704 also may be used for storing temporary variables or other intermediate information during execution of the instructions to be executed by the processor 702. The computer 700 further includes a read only memory (ROM) 706 or other static storage device coupled to the bus 718 for storing static information and instructions for the processor 702. A computer readable storage device 708, such as a magnetic disk or optical disk, is coupled to the bus 718 for storing information and instructions for the processor 702. The computer 700 may be coupled via the bus 718 to a display 710, such as a liquid crystal display (LCD) or a cathode ray tube (CRT), for displaying information to a user. The display 710 may additionally serve as an input device by providing a touch screen interface.

An input device 712, including, for example, alphanumeric and other keys, is coupled to the bus 718 for communicating information and command selections to the processor 702. Another type of user input device is a cursor control 714, such as a mouse, a trackball, or cursor direction keys for communicating direct information and command selections to the processor 702 and for controlling cursor movement on the display 710. The cursor control 714 typically has two degrees of freedom in two axes, a first axis (e.g., x) and a second axis (e.g., y), that allow the device to specify positions in a plane.

The term "computer readable instructions" as used above refers to any instructions that may be performed by the processor 702 and/or other component of the computer 700. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 708. Volatile media include dynamic memory, such as the main memory 704. Transmission media include coaxial cables, copper wire and fiber optics, including wires of the bus 718. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 702 for execution. For example, the instructions may initially be borne on a magnetic disk of a remote computer. The remote computer can load the instructions into its dynamic memory and send the instructions over a telephone line using a modem. A modem local to the computer 700 can receive the data on the telephone line and use an infrared transmitter to convert the data to an infrared signal. An infrared detector coupled to the bus 718 can receive the data carried in the infrared signal and place the data on the bus 718. The bus 718 carries the data to the main memory 704, from which the processor 702 retrieves and executes the instructions. The instructions received by the main memory 704 may optionally be stored on the storage device 708 either before or after execution by the processor 702.

The computer 700 may also include a communication interface 716 coupled to the bus 718. The communication interface 716 provides a two-way data communication coupling between the computer 700 and a network. For example, the communication interface 716 may be an integrated services digital network (ISDN) card or a modem used to provide a data communication connection to a corresponding type of telephone line. As another example, the communication interface 716 may be a local area network (LAN) card used to provide a data communication connection to a compatible LAN. Wireless links may also be implemented. In any such implementation, the communication interface 716 sends and receives electrical, electromagnetic, optical, or other signals that carry digital data streams representing various types of information. The storage device 708 can further include instructions for carrying out various processes for image processing as described herein when executed by the processor 702. The storage device 708 can further include a database for storing data relative to same.

Embodiment(s) of the present invention are illustrated herein by example, and various modifications may be made by a person of ordinary skill in the art. For example, although the speed-detection system has been described above as having a single laser, the speed-detection system could also be used with a plurality of lasers. Such a device would allow for parallel and simultaneous determination of the speeds of multiple vehicles.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of laser-based speed determination, the method comprising:

determining, by a processing device via a digital scan of a field of view, a location of a target;

directing, by the processing device via a laser-aiming device in communication with the processing device, a laser from a laser device to the determined location of the target;

determining a speed of the target via light reflected from the target to the laser device;

displaying an annotated field of view, the annotated field of view comprising the field of view and the determined speed of the target;

wherein the target comprises an automobile;

wherein, during at least a portion of each of the determining of a location, the directing, and the determining of a speed, the target and a laser-based speed-determination system comprising the processing device and the laser-aiming device are each independently in motion relative to a fixed point; and wherein the determining of a speed comprises detecting and considering ground speed of the laser-based speed-determination system.

2. The method of claim 1, wherein:
the step of determining a location of a target comprises determining a location of a plurality of targets;
the directing step comprises directing, via the laser-aiming device, the laser to the determined location for each of the plurality of targets; and
the step of determining a speed of the target comprises determining a speed of the plurality of targets via light reflected from the plurality of targets to the laser device.

3. The method of claim 2, wherein the annotated field of view comprises the determined speed for each of the plurality of targets.

4. The method of claim 1, wherein the laser-aiming device comprises a dual mirror system.

5. The method of claim 4, wherein the dual mirror system comprises a first mirror that permits aiming of the laser-aiming device in a horizontal direction and a second mirror that permits aiming of the laser-aiming device in a vertical direction.

6. The method of claim 1, wherein:
the determined location of the target comprises a set of coordinates; and
the directing step comprises directing, via the laser-aiming device, the laser to the set of coordinates.

7. The method of claim 6, wherein the field of view comprises one or more images provided by a camera.

8. The method of claim 7, wherein the step of determining the location of the target comprises:
identifying an identifiable feature of the automobile within the one or more images provided by the camera, the identifiable feature having a reflective surface; and
determining a set of coordinates for the identifiable feature.

9. The method of claim 8, wherein the identifiable feature is a license plate.

10. The method of claim 1, wherein the laser-aiming device comprises a device that pans and tilts.

11. The method of claim 5, wherein the first and second mirrors are attached to an electromechanical actuator.

12. The method of claim 1, wherein the laser-aiming device comprises a rotating mirror wheel having a plurality of mirror facets.

13. The method of claim 12, wherein:
vertical aim of the laser-aiming device is permitted by a change in angular orientation of the plurality of mirror facets as the rotating mirror wheel rotates; and
horizontal aim of the laser-aiming device is permitted by each of the plurality of mirror facets having a distinct horizontal inclination.

14. The method of claim 1, wherein the laser-aiming device comprises a single mirror mounted in a mechanical armature that pivots both horizontally and vertically.

15. The method of claim 1, further comprising calibrating the laser-aiming device according to the field of view.

16. A laser-based speed-determination system, the system comprising:
a laser device;
a laser-aiming device coupled to the laser device;
a processing device in communication with the laser device and the laser-aiming device, the processing device being adapted to execute instructions to:
determine, via a digital scan of a field of view, a location of a target;
cause, via the laser-aiming device, a laser to be directed from the laser device to the determined location of the target;
determine a speed of the target, the speed being determined via light reflected from the target to the laser device;
a display device in communication with the processing device;
wherein the processing device is operable to execute instructions to display an annotated field of view on the display device, the annotated field of view comprising the field of view and the determined speed of the target;
wherein the target comprises an automobile;
wherein, during at least a portion of each of the determination of a location, the causing to be directed, and the determination of a speed, the target and a laser-based speed-determination system comprising the processing device and the laser-aiming device are each independently in motion relative to a fixed point; and
wherein the determination of a speed comprises detection and consideration of ground speed of the laser-based speed-determination system.

17. The system of claim 16, wherein the processing device is operable to:
determine, via a digital scan of the field of view, a location of a plurality of targets;
cause, via the laser-aiming device, a laser to be directed from the laser device to the determined location for each of the plurality of targets; and
determine a speed for each of the plurality of targets, the speed being determined via light reflected from the plurality of targets to the laser device.

18. The system of claim 17, wherein the annotated field of view comprises the determined speed for each of the plurality of targets.

19. The system of claim 16, wherein the laser-aiming device comprises a dual mirror system.

20. The system of claim 19, wherein the dual mirror system comprises a first mirror that provides aiming of the laser-aiming device in a horizontal direction and a second mirror that permits aiming of the laser-aiming device in a vertical direction.

21. The system of claim 16, wherein:
the determined location of the target comprises a set of coordinates; and
the processing device, via the laser-aiming device, directs the laser to the set of coordinates.

22. The system of claim 21, wherein the laser-based speed-determination system further comprises a camera and the field of view comprises one or more images provided by the camera.

23. The system of claim 22, wherein determining the location of the target comprises:

identifying an identifiable feature of the automobile within the one or more images provided by the camera, the identifiable feature having a reflective surface; and determining a set of coordinates of the identifiable feature.

24. The system of claim 23, wherein the identifiable feature is a license plate.

25. The system of claim 16, wherein the laser-aiming device comprises a device that pans and tilts.

26. The system of claim 20, wherein the first and second mirrors are attached to an electromechanical actuator.

27. The system of claim 16, wherein the laser-aiming device comprises a rotating mirror wheel having a plurality of mirror facets.

28. The system of claim 27, wherein:

vertical aim of the laser-aiming device is permitted by a change in angular orientation of the plurality of mirror facets as the rotating mirror wheel rotates; and horizontal aim of the laser-aiming device is permitted by each of the plurality of mirror facets having a distinct horizontal inclination.

29. The system of claim 16, wherein the laser-aiming device comprises a single mirror mounted in a mechanical armature that pivots both horizontally and vertically.

30. The system of claim 16, wherein the laser-aiming device is calibrated according to the field of view.

* * * * *